(12) United States Patent
Shacham et al.

(10) Patent No.: US 9,277,012 B2
(45) Date of Patent: Mar. 1, 2016

(54) APPARATUS AND METHOD FOR TRACKING TRANSACTION RELATED DATA

(75) Inventors: Lanir Naftay Shacham, Ramat Hasharon (IL); Oren Shlomo Elias, Herzeliya (IL)

(73) Assignee: CORRELSENSEL LTD, Herzeliya Pituach (IL)

( * ) Notice: Subject to any disclaimer, the term of this patent is extended or adjusted under 35 U.S.C. 154(b) by 1321 days.

(21) Appl. No.: 12/293,281

(22) PCT Filed: Aug. 27, 2007

(86) PCT No.: PCT/IL2007/001062
§ 371 (c)(1),
(2), (4) Date: Sep. 17, 2008

(87) PCT Pub. No.: WO2009/027961
PCT Pub. Date: Mar. 5, 2009

(65) Prior Publication Data
US 2010/0228650 A1    Sep. 9, 2010

(51) Int. Cl.
*H04L 29/08* (2006.01)
*G06F 17/30* (2006.01)
*G06Q 30/04* (2012.01)
*H04L 29/06* (2006.01)

(52) U.S. Cl.
CPC ........ *H04L 67/125* (2013.01); *G06F 17/30477* (2013.01); *G06F 17/30595* (2013.01); *G06Q 30/04* (2013.01); *H04L 63/1416* (2013.01); *H04L 69/22* (2013.01); *G06F 2221/2119* (2013.01); *H04L 63/0227* (2013.01)

(58) Field of Classification Search
None
See application file for complete search history.

(56) References Cited

U.S. PATENT DOCUMENTS

| 7,496,052 B2 * | 2/2009 | Jain et al. ................. 370/254 |
| 2003/0187970 A1 * | 10/2003 | Chase et al. ................. 709/223 |
| 2005/0144171 A1 * | 6/2005 | Robinson ................. 707/9 |
| 2006/0015512 A1 * | 1/2006 | Alon et al. ................. 707/100 |
| 2010/0132024 A1 * | 5/2010 | Ben-Natan et al. ............. 726/9 |

FOREIGN PATENT DOCUMENTS

WO    02/13479    2/2002

* cited by examiner

*Primary Examiner* — Ryan Zeender
*Assistant Examiner* — Denisse Ortiz Roman
(74) *Attorney, Agent, or Firm* — Soroker-Agmon (57) ABSTRACT

A method of tracking information in a multi-tier computerized environment, the method comprising: receiving an at least one packet; storing data associated with the at least one packet and with an at least one request or transaction associated with the at least one packet; parsing a byte stream generated from conversion of the at least one packet; detecting data associated with the at least one request or transaction related to the byte stream; matching a thread associated with the byte stream with the at least one request or transaction associated with the at least one packet according to predetermined fields within the byte stream, an apparatus for implementing the same and methods for determining resource consumption of requests or transactions.

15 Claims, 5 Drawing Sheets

APPARATUS AND METHOD FOR TRACKING TRANSACTION RELATED DATA

BACKGROUND OF THE INVENTION

1. Field of the Invention

The present invention relates to tracking transaction related data within a computerized device in general, and to tracking transaction related data in a multi-tier computerized environment, in particular.

2. Discussion of the Related Art

A complex, multi-tier computerized network environment makes it difficult to keep track of a single transaction as it spans across multiple tiers. A tier can be a software or hardware module that executes an application. An example for such multi-tier computerized environment can be shown in FIG. 1, Multi-tier computerized network environment 100 comprises three tiers—an http server 115 (Tier 1), application server 120 (Tier 2), a storage element, for example a database server 150 (Tier 3). Communication between the tiers is bidirectional. For example, requests are transmitted from one tier to another and data related to the requests is sent back to the requesting tier. HTTP request 110 is received at HTTP server 115 (Tier 1). As a result, HTTP server 115 (Tier 1) transmits two Internet Inter Operable Protocol (IIOP) requests 120, 125 to application server 130 (Tier 2). In other cases, two different requests may be transmitted to two different tiers. Application server 130 receives IIOP request 120 that issues request 135 and IIOP request 125 that issues requests 140 and 145. SQL request 135 is transmitted to database tier 150 (Tier 3) in order to provide data to HOP request 120. After SQL request 135 is satisfied, the data related to the response for the SQL query is transmitted hack to application server 130 (Tier 2). Next, SQL requests 140, 145 are transmitted to database tier 150 (Tier 3) in order to provide data to IIOP request 125. After both requests 120 and 125 are satisfied, data related to IIOP requests 120, 125 is transmitted hack from application server 130 (Tier 2) to HTTP server 115 (Tier 1) so HTTP request 110 can be satisfied. Tier 3 is not capable, according to the computerized environments disclosed in the prior art, to detect the tier that transmitted SQL request 135, Further, Tier 1 is not capable of detecting that the performance of Tier 3 may also be affected by requests 120, 125.

In such an environment, a transaction may start in a HTTP tier, such as a web portal, and then travel across various different legacy systems, servers, databases; packaged and homegrown applications. A transaction is mostly composed of more than one request, transmitted among tiers for receiving data or for transmitting commands, for example a request may transmit a process in command to one tier, which results in a mathematical analysis of data stored within a database tier. Each single transaction is generated by either a person or an automatic computer system sending commands, eventually spanning through more than one physical or logical tier within the application processing the transaction. A single request arriving to the entry point of an application, the web server for example, will generate additional requests in other tiers. Now known systems try to achieve "tree" like view that will represent the flow of a transaction including additional requests generated in order to satisfy the transaction. Such attempts have not been successful.

In present computerized environments, there is currently no efficient manner of tracking the accurate route of a single transaction in a generic manner that combines various configurations and topologies. Current solutions do not provide the ability to track and present an accurate tracking and flow of a single transaction or several transactions. In addition, present solutions do not provide a tool for measuring the overall resource consumption each request requires in a specific tier. Resource consumption can be determined in many measurable attributes, such as time, memory units, bandwidth, amount of data and the like.

One presently available solution offers assigning a unique transaction ID for each new transaction. According to this solution, a processing tier logs the requests and its related parameters, such that these logs are received at a central storage where the route can be detected by correlating the requests according to the unique transaction ID with the said logs. This solution is inadequate and limited because it is limited to systems where all the applications and processing tiers share the same holder, programmer, supplier or another entity that can access the code. However, most currently available computerized environments comprise a plurality of operating systems, communications protocols, databases and the like, making the above solution ineffective. Another approach is to capture a content related to events or requests, such as for example, registers or memory content. According to the suggested solution, one can extract most of the SQL commands handled by the examined database, but cannot extract all the SQL commands because of delay between the time an incoming request arrive to the time of its extraction, since new commands need to be processed before extraction. Hence, the above solution is not up-to-date and does not provide transaction related data in real-time. Further, the delayed data prevents the solution to provide data with sufficient accuracy.

Another approach uses existing APIs exposed by the tiers. For example, a module can request from a Java Virtual Machine (JVM) to be notified every time a request is handled by the JVM. This allows the extraction of every event within the JVM. The above approach is not generic and depends on the specific tier. If the tier modifies its APIs or internal structure, the method will cease to perform and will require adjustments. In addition, the above method cause performance overhead; therefore, it is problematic when used in production environments. The above methods are based on the existence of a unique id in order to reassemble the transaction route. If no such id exists then they have no way to track. Several solutions for tracking transactions and requests parse data between tiers in the application level. The resolution of such data is insufficient and tracking is inaccurate. Further, the time required until data is transmitted to the application level prevents the described solution to provide real time results and to pause or terminate requests and transactions before they are handled in the tiers.

There is therefore a need for a new method and apparatus for tracking transactions in realtime and in an efficient and accurate manner.

SUMMARY OF THE PRESENT INVENTION

The subject matter mainly discloses a method of tracking information in a multi-tier computerized environment, the method comprising: receiving an at least one packet; storing data associated with the at least one packet and with an at least one request or transaction associated with the at least one packet; parsing a byte stream generated from conversion of the at least one packet; detecting data associated with the at least one request or transaction related to the byte stream; and matching a thread associated with the byte stream with the at least one request or transaction associated with the at least one packet according to predetermined fields within the byte stream.

The subject matter also discloses a computer program embodied on a computer-readable media for tracking information in a kernel space of a multi-tier computerized environment comprising a set of instructions for implementing the method above.

The subject matter also discloses a step of storing data related to the at least one request or transaction associated with the at least one packet.

The subject matter also discloses a step of determining that at least one request or transaction is associated with another request by comparing an at least one previously stored parameter associated with the at least one request or transaction and with the other request.

It is another object disclosed in the subject matter wherein the at least one parameter is selected from a group consisting of: a thread ID, request ID transaction ID, IP:port address of a request source, IP address of a request destination, IP address of a transaction. source, IP address of a transaction destination, IP address of a tier that transmitted a request, port number of the source or destination of a request, ID of a request that generated the request or transaction and a combination thereof.

The subject matter also discloses a step of storing data related to the at least one request or transaction associated with the at least one packet.

The subject matter also discloses a step of determining whether the at least one packet is an incoming or an outgoing packet.

The subject matter also discloses a step of determining whether to tag the at least one outgoing packet. The subject matter also discloses a step of tagging the at least one outgoing packet.

The subject matter also discloses a step of prioritizing the at least one request or transaction according to an entity associated with the at least one request or transaction.

The subject matter also discloses a step of determining measurable attributes related to consumption of resources within tiers by the at least one request or transaction.

The subject matter also discloses a step of determining a profile for the at least one request based on data associated with measurable attributes related to consumption of the resources tiers by the at least one request.

The subject matter also discloses a step of determining measurable attributes related to consumption of tiers by the transaction as a function of consumption of the resources within tiers by the at least one request associated with the transaction.

The subject matter also discloses a step of determining a profile for the at least one transaction based on data associated with measurable attributes related to consumption of the resources within tiers by the at least one transaction.

The subject matter also discloses a step of predicting consumption of measurable attributes of a the resources within tiers according to profile and quantity of the at least one request or transaction handled by the tier during a predetermined period of time.

The subject matter also discloses a step of prioritizing the at least one request or transaction as a function of measurable attributes related to consumption of the resources within tiers by the at least one request or transaction.

The subject matter also discloses a step of determining whether to delay or pause a thread according to the priority of the at least one request or transaction related to the thread.

The subject matter also discloses a step of determining the tier's required resources according to the profile of the transaction or request consuming the resource within the tier.

The subject matter also discloses a step of allocating the resources within tiers to the at least one request or transaction according to the priority of the at least one request or transaction.

The subject matter also discloses a step of limiting the resources within tiers allocated to the at least one request or transaction according to consumption of tiers required by another request or transaction.

The subject matter also discloses a step of analyzing the stored data as a function of predetermined parameters.

The parameters may be selected from a group consisting of language, entity related to transactions, currency, user, residence, client, transaction, request, tier's performance, number of tiers, time, quality of service and a combination thereof.

The subject matter may be performed in the kernel level of the multi-tier computerized environment.

A main aspect of the subject matter discloses a method of tracking information in a multi-tier computerized environment, the method comprising: receiving an at least one incoming packet; storing data associated with the at least one incoming packet and with an at least one request or transaction associated with the at least one packet; converting the incoming packet into a byte stream; parsing the byte stream and detecting data related to applicative events or requests; logging IP:port address related to the at least one request or transaction.

The subject matter also discloses a computer software embodied on a computer-readable medium comprising a set of instructions for implementing the above method.

The subject matter also discloses a step of querying the operating system regarding IP address and port used by each request.

The subject matter also discloses a step of associating at least one request with an at least one request or transaction according to the thread ID, IP:port address and time stamp related to the at least one request or transaction.

The subject matter also discloses steps of detecting numbers or characters that repeats in at least two requests and associating the requests according to the repeating number or characters.

A main aspect of the subject matter discloses a computerized apparatus for tracking information of a multi-tier computerized environment comprising: a tagging unit located within each tier for detecting information related to an at least one request or transaction from a packet; a parsing unit for detecting data associated with the at least one request or transaction from a byte stream; a storage associated with the tagging unit and the parsing unit for storing data related to the at least one request or transaction from the packet and the byte stream; a processing unit for associating data in the storage, related to the at least request or transaction detected from the packet and from the byte stream.

The tagging unit may be located within the kernel level.

The parsing unit may be located within the kernel level.

The subject matter also discloses further comprising a central storage for storing data related to a transaction resource consumption in an at least one tier.

The subject matter also discloses further comprising a central processing module for determining resource consumption related to a transaction resource consumption in an at least one tier.

A main aspect of the subject matter discloses a method of determining the amount of money billed by an at least one consumer of IT infrastructure multi-tier computerized environment, the method comprising: determining amounts of measurable attribute consumed by the at least one consumer of IT infrastructure; determining the amount of money to be paid for consuming a measurable attribute of a resource; determining a payment value as a function of the resource consumption of the at least one transaction requested by the at least one entity that consume IT resources.

The subject matter also discloses a method in which the at least one entity is at least two entities consuming the resources, wherein payment values are determined as a function of the rate of resource consumption between the at least two entities.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION OF THE PREFERRED EMBODIMENT

The subject matter discloses a method and apparatus for tracking transaction related data in a multi tier computerized environment. The disclosed subject matter detects data in both the packet level and the byte stream level, associates the said data and match transactions with threads accordingly.

The method comprises a step of receiving a packet in a tier. A tagging unit may determine whether the packet is an incoming or an outgoing packet. If a packet is outgoing, tagging unit determines whether to tag the packet or not. An incoming packet may contain a request from the tier in which the packet is received or a respond from another tier, while an outgoing packet comprises a request from another tier or a response from the tier it was sent from. An agent in the kernel level of the tier detects whether the packet comprises information related to a transaction and stores such information. After detecting and storing data related to a transaction from the incoming packet, the packet is converted into a byte stream by the operating system. The conversion may be performed using a TCP reassembly process. Next, the byte stream is associated with a thread by the operating system; the thread may generate further requests. After the thread is associated with the byte stream, a parsing unit parses the byte stream and detects data related to transactions or requests. In some cases parsing unit parses the responses sent by the thread, in order to achieve better protocol dissection. Both data detected from the packet level and data detected from the byte stream level is stored in storage. The storage may be located within or associated with the same tier. In some embodiments, the storage communicating with the packet and byte stream levels resides within the kernel level to reduce overhead. In addition to storage associated with each tier, the apparatus performing the disclosed methods may comprise a central storage, in communication with each tier, in which records are stored for tiers, transactions or data related thereof. Associating data from the byte stream and from the packet may be performed according to data fields such as transaction ID, IP addresses, requests ID and the like parsed from the byte stream and logged from the packet. After the request is executed, a byte stream is transmitted back to the kernel level, namely an outgoing byte stream. The outgoing byte stream may comprise additional requests, namely outgoing requests that relate to the same transaction to which the incoming request related.

Associating an incoming request and an outgoing request may be performed by detecting a field indicating which request resulted the detected request. In other words, detect which request was executed and generated the outgoing byte stream that contains the outgoing requests. Other metadata such as transaction ID, time stamp or IP:port address may also be utilized when comparing requests in order to associate requests related to the same transaction. In The incoming request ID is provided within the incoming byte stream, converted from one or more packets, and stored in a parent request field of the outgoing requests.

Figure 2:
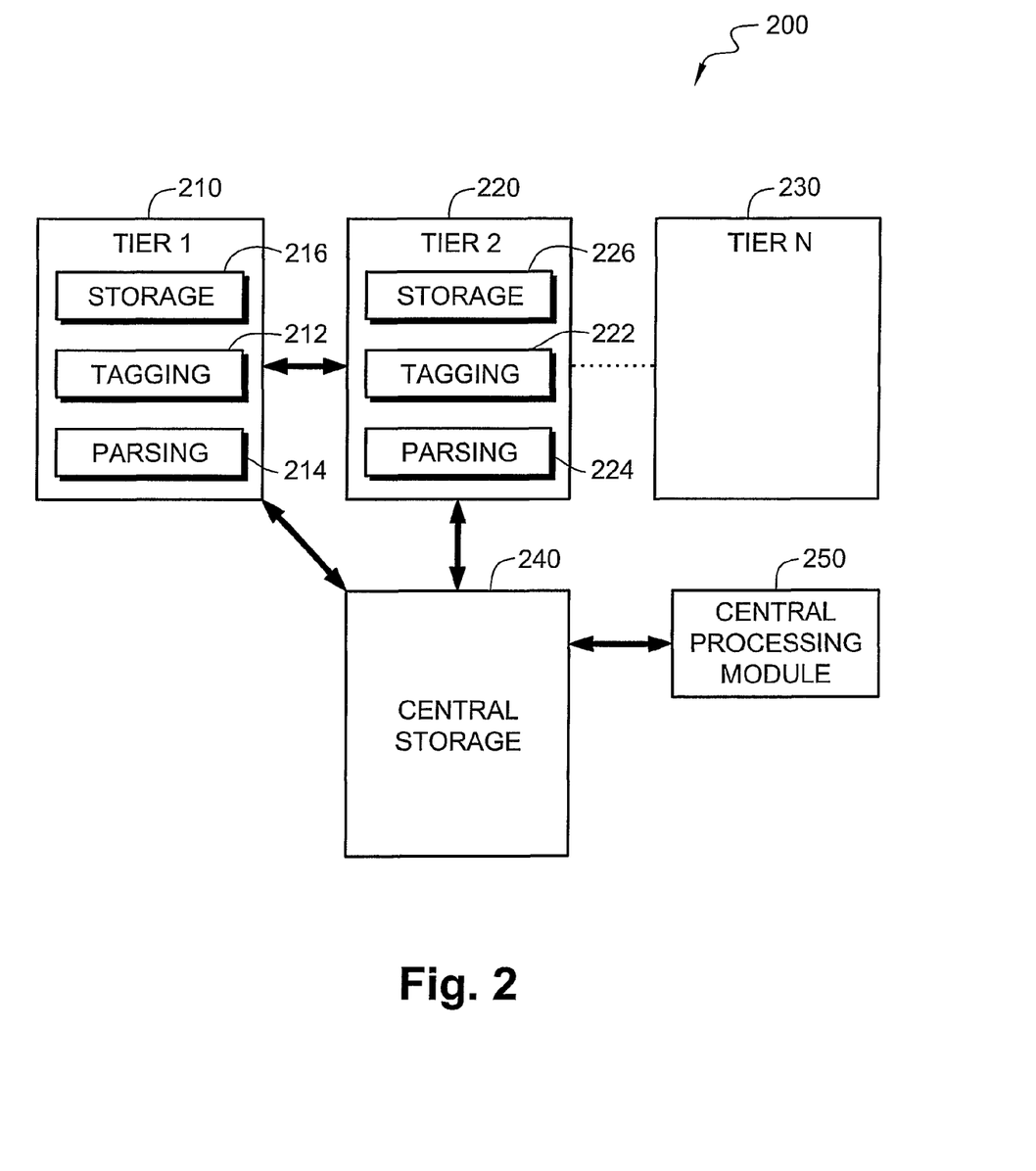
FIG. 2 is a schematic illustration of a computerized multi-tier environment and an apparatus for tracking transactions, in accordance with a preferred embodiment of the disclosed subject matter.

Referring to FIG. 2 that schematically illustrates an apparatus for tracking transactions in a multi-tier computerized environment. The apparatus comprises software or hardware agents installed in a tier. The apparatus preferably comprises two agents. The first agent is located in the kernel level of the said tier, and comprises a parsing unit, storage and optionally a tagging unit. Another agent is a user space agent that communicates with the agent in the kernel level, preferably resides within the user space. By providing a parsing unit in the kernel level, the apparatus can detect data in a significantly more accurate and generic way than prior art solutions, in the resolution of packets and byte streams instead of requests. Further, packets or byte stream resolution enables generic analysis of the parsed data, in various applications, unlike prior art solutions that provide parsing in the application level.

Figure 1:
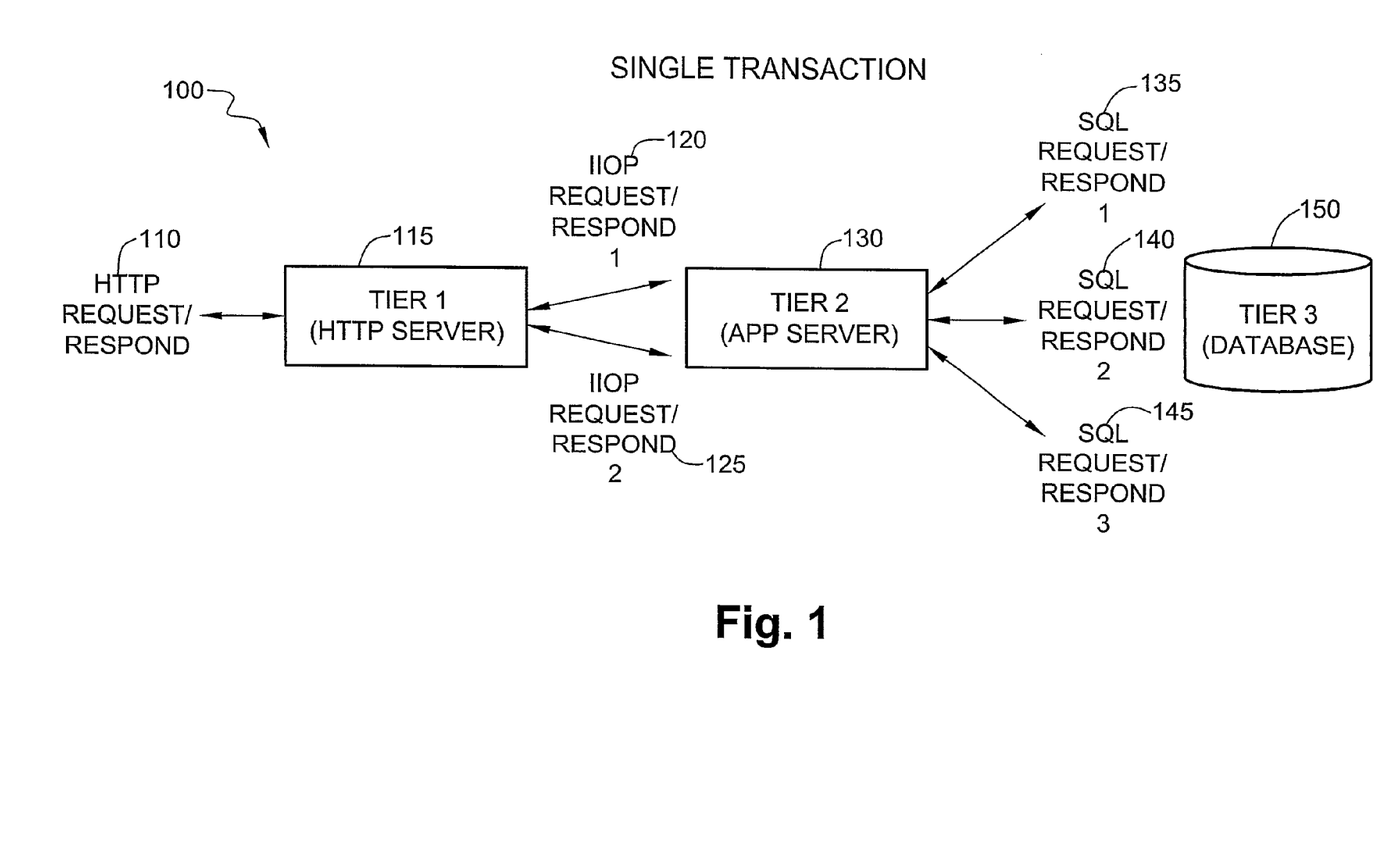
FIG. 1 is an illustration of a computerized multi-tier environment and requests transmitted among the tiers, in accordance with a preferred embodiment disclosed in the prior art.

The following description relates to Tier 1 (210) for simplicity. The first agent resides within the kernel space of the hosting machine and detects incoming and outgoing packets arriving in or sent from the tier. The agent in the kernel level comprises tagging unit 212 that determines whether a packet is an incoming packet or an outgoing packet, based on IP addresses and ports in the packet, or a flag within the packet or within the handling layer by the operating system, indicating whether the packet is incoming or outgoing. Tagging unit 212 may determine whether to tag or not to tag an outgoing packet. Tagging unit 212 is located within or in communication with a packet channel. The outgoing packet is tagged by tagging unit 212, only if the packet matches the thread in terms of request ID, transaction ID, IP:port address of the source or destination of the request or transaction, and the like. In case the packet is incoming, the agent determines whether it was tagged. In case the packet was tagged the information it carried may he stored in the local storage. Tagging is done by adding data to the packet in a predefined field, for example modifying IP HEADER OPTIONS. The ID tag written in the IP HEADER OPTIONS may include tag prefix, transaction ID, ID of the tier that generated the event, checksum, event ID, request ID or the like. One of the data fields added as a tag is the ID of the request that generated the following requests, namely the parent ID. A parent event has a child event, which is the event generated after execution of the parent event. When data related to requests is logged, requests may be associated according to the parent ID. As shown in FIG. 1, request ID of request 110 is the parent ID of requests 120 and 125, and request 120 is the parent of request 130. Thus, request 130 is associated with request 110 by the parent ID field.

The apparatus further comprises parsing unit 214 for parsing data after the packet is converted into a byte stream. Parsing unit 214 is located within the byte stream or the socket level, Both levels are within the kernel space. In case the packet is incoming, and the incoming packet comprises data that relates to a transaction, specific data fields from the packet are logged in storage 216. The incoming packet delivers the incoming request. The incoming packet is converted into a byte stream associated with a thread executing the request in the application level. After the request is processed, a byte stream is transmitted to the kernel space. The byte stream from the application level may comprise the response to the incoming request or further requests generated by the incoming request that relate to the same transaction. The byte stream transmitted from the application level, namely outgoing byte stream, is converted into one or more outgoing packets before transmitted to another tier. Storage 216 stores records related to packets to be tagged, records related to previous tagged packets, data related to previous requests handled by the tier associated with the storage, data related to incoming requests and the like. The parsing unit may update records in storage 216. In an exemplary embodiment, a storage associated with the tier comprises a tagging record for the request or transaction handled by the agent on a given moment. The tag may be a numeric value or a characteristic value, such as event ID, request ID, the tier from which the request was generated, and the like. Each event has a parent event ID, and each event ID is unique within the tier it was generated in. A new event ID is assigned to an event when the event arrives to its designated tier. Such event ID is provided in a large field, such as a 32 or 64 bits' field, therefore the ID is unique.

After the agent in the kernel level handles a packet, one or more packets are converted into a byte stream by the operating system. Next, the byte stream is associated with a thread. The byte stream associated with a thread is detected by parsing unit 214. Parsing unit 214 detects data from the byte stream that may relate to transactions or requests, such as transaction ID, IP addresses of the source or destination, source IP port, destination IP port, request ID, and the like. Parsing unit 214 handles incoming or outgoing traffic at the byte stream level. Parsing unit 214 determines whether data in the byte stream is equivalent to a communication or data transfer protocol selected from a predefined group. The group may comprise TCP/IP based protocols used for inner application communication, such as HTTP1.0, HTTP1.1, Oracle NET8, TDS, AJP12, AJP13, IIOP, SMTP, IMAP, RPC, FTP or others. The abovementioned protocols can represent HTTP requests, SQL commands, RPC calls or other requests from tiers in a multi tier environment. Other protocols may be layer 3 or layer 4 based protocols such as UDP, SPX, SCTP, SINCE, IPX, SPX, IPV6, IPV4, ARP, BGP, EGP, ICMP, IGMP, IPSEC MPLS, OSPF, RARP, RIP, or layer 6 or layer 7 based protocols such as AFP, BACNET, BITTORRENT, DHCP, NETBIOS, or over other protocols such as SNA, DCC, SOCKS and the like.

Parsing unit 214 extracts relevant information from the byte stream data. Next, parsing unit 214 updates the event record within storage 216 with the thread ID of the thread associated with the specific byte stream after determining that a byte stream relates to a request previously generated in a previous tier. The step of determining that a byte stream relates to a transaction or a request may be performed by associating IDs of the request that generated the handled request with the handled request ID. Each request can only have a single parent request, and can have several children. The disclosed subject matter tracks the requests in each tier, and puts in the tag the id of the request that the thread reacted to and generated more requests sent to the next tier; therefore, it is the parent request id of the new requests that were sent to the next tier. Tracking may also be performed by comparing data from the byte stream with data stored in storage 216. Parsing unit 214 may perform several parsing methods, either complicated parsing methods or shallow parsing. Suggested parsing methods may be Top-down parsing, such as recursive descent parser, LL parser, packrat parser, or bottom-up parsing methods such as precedence parser, BC (bounded context) parsing or LR parser and the like.

In order to determine whether an incoming request is a new transaction or a request, the apparatus determines whether the request handled within the tier is associated with another tier, from which the request was transmitted, or whether the request has a parent ID. This step is performed on incoming requests, before the content of the request arrives to the application level. Every incoming request is assigned with a long ID that is unique for the specific tier. The size of the long ID may be 128 bits. Parsing unit 214 determines that a request is incoming according to a command field, such as GET, POST, SELECT, UPDATE and the like. Parsing unit assigns a new request ID for that request, and logs the timestamp related to the request as a timestamp of a new request. Further, the user space agent communicating with both central storage 240 and the agent within the kernel level notifies central storage 240 regarding the new transaction. A unique transaction ID may be assigned using a hash function for receiving a unique id for each transaction type the moment the transaction arrives, without interacting with the server. Such transaction type ID is also in the tag, in addition to parent request ID. Transaction type ID may be provided for additional analysis and proactive resource management, such as blocking or postponing requests according to resource consumption of a specific transaction.

After detecting data related to transactions from the byte stream, parsing unit 214 sends the transaction related details to storage 216, being in communication with both tagging unit 212 and parsing unit 214. Storage 216 stores data from both the packet level and the byte stream level so the storage within a tier is capable of matching data related to a byte stream and data related to a packet according to stored details. Parsing unit 214 may not have access to the transaction ID or parent request ID, previously stored in storage 216 by tagging unit 212. For example, in case a new incoming request is logged, a new request ID is assigned, and the request's source ip:address and destination ip:address are parsed by parsing unit 214, and can be matched by storage unit 216 with prior incoming packets which composed the byte stream containing the incoming request. These incoming packets carry the transaction ID and parent request ID of the request. Parsing unit 214 also detects the thread associated with the request; hence, a thread is associated with an incoming request and with the request from the previous tier that generated this new request. In case the thread generates another request to another tier, such as tier 2 (220), the request may be detected by tier 2 (220) as a packet detected by tagging unit 222, converted into a byte stream and parsed by parsing unit 224. Details stored in storage 226 may match a thread generated within tier 2 (220) with the packet previously received in tier 2 (220). Some of the details stored in storage 226 may be sent to central storage 240 for further analysis. Central storage 240 is in communication with the user agent in the application level, that communicates with each of the storages located within or associated with each tier, for example storage 216 in tier 1 (210). Central storage 240 logs data related to requests or transactions, incoming or outgoing from any tier that sends data to central storage 240. Thus, central storage 240, communicating with central processing module 250, may track the path taken by a single transaction according to the path taken by one or more requests related to the transaction in the different tiers according to the tier from which the request was transmitted. Additionally, central processing module 250 may determine total elapsed time of a single transaction or other details related to a transaction by the data relates to the requests and the tiers that execute the requests generated to execute the transaction. Central storage also logs resource consumption of the thread provided from user space agent. Parsing unit 214 detects measurable attributes of CPU, memory, I/O or any other resource measured by the operating system consumption before and after handling the request, preferably by updating fields in storage 216 that relate to the time when a request starts and ends using the memory or CPU. The agent may query the operating system regarding the resource consumption status of a specific thread. The query may be sent before the thread starts to handle the request, in order to receive the start time of using a resource. Afterwards, when the thread sends an outgoing byte stream, the agent may send another query regarding the resource consumption of the thread. The difference between the start time and the end time is the actual consumption used by the thread for handling this specific request. Tracking can be more accurate, by logging consumption status before the request is handled, after it is handled, before the response to this request is handled, and after the response is handled. Thus, an accurate resource consumption profile for a request is provided. The elapsed time for using a resource may also be transmitted to central storage 240.

As a result, central storage 240 may determine measurable attributes consumed by each of the requests or transactions, by summing the amount of resources consumed by the request that relate to a transaction. For example, in ease a transaction is composed of a single request from tier 1, that single request may generate three additional requests to three different tiers. Central storage may sum resource consumption of the single request and the resource consumption of the three additional requests to determine resource consumption of the transaction, such as the time requests related to the transaction are handled in each tier.

The three additional requests are associated with the single request that composed the transaction using the method and apparatus disclosed in the subject matter. Therefore, central storage 240 and central processing module 250 may determine that said transaction consumes the resources or threads associated with the single request and the three additional requests. Central storage 240 may also store historical data related to former transactions or data related to users' specifications. Central storage 240 and central processing module 250 may associate an entity such as a user Or a group of users with a transaction. The association may be performed by parsing the requests and extracting parameters sent between tiers which can identify the user or group of users that sent the specific transaction. As a result, processing unit may generate notifications to one or more tiers regarding priority levels of packets, requests or transactions according to preprocessed resource consumption predicted for a specific request or transaction, and the person or entity related to the transaction.

The apparatus described above relates to synchronous multi tier environments, in which each thread consumes tier's resources until the termination of the transaction. In asynchronous multi tier environments, thread-to-thread table is used to associate threads with byte streams according to IP:port address of the source and the destination of a request. One axis of the table maybe provided for the sending thread and the other axis may be provided for the receiving thread of a request. The cells within the table comprise data related to the request handled by both the receiving thread and the sending thread. Such data may be IP:port address of the source and destination of the request or any other table that can correlate between an incoming request and an outgoing request, either based on characters or numbers within the request itself, detected by the parser.

Figure 3:
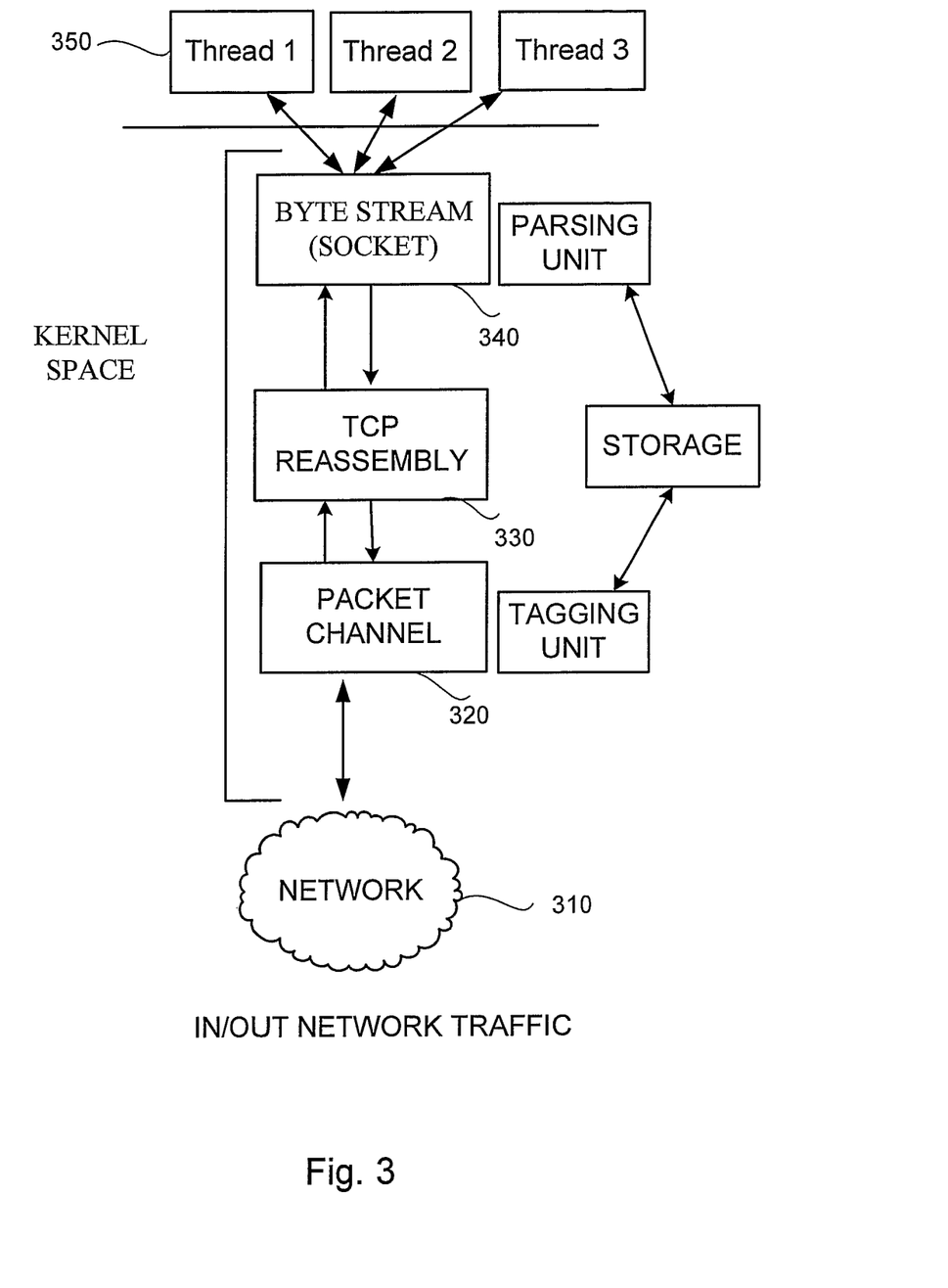
FIG. 3 is an exemplary description of the elements in the kernel level and data flow to and from the operating system, in accordance with a preferred embodiment of the disclosed subject matter.

Referring now to FIG. 3, illustrating a schematic embodiment of elements in the kernel space that perform transaction tracking as disclosed in the subject matter.

When an incoming packet is received at a specific tier from network 310, the packet is stored in common packet channel 320. Packet channel 320 may comprise one or more queues, preferably priority queues. While stored in packet channel 320, an incoming packet keeps its basic structure, divided into data field and additional fields that indicate data such as IP:port addresses. Next, the incoming packet is detected by the tagging unit and preferably logged in the storage. The packet is converted into a byte stream by the operating system preferably using a TCP reassembly process. By the end of the TCP reassembly process, the data is presented as a byte stream, not in a field structure, as presented in packets.

After a thread is associated with incoming byte stream 340, the parsing in unit parses the byte stream to detect if any data in the byte stream may be associated with a specific request based on thread ID, IP:port addresses of the source or the destination, request ID, request parent ID and the like. After parsing the data from the byte stream, it is compared with the data stored in the storage and the byte stream may be associated with a packet. Next, a thread may be associated with a parent request that arrived to the previous tier, and caused additional requests arriving at the tier and detected by the parser.

After detecting the incoming byte stream by the parsing unit, the byte stream is associated with a thread and transferred to the application level. After a request is processed in the application level, a byte stream is received at the kernel level as an outgoing byte stream, again detected by the parsing unit and associated with a request or a transaction. The outgoing byte stream may include a reply from the application, or include data related to additional requests related to the transaction. The additional requests are generated after the handled request is processed in the tier and may be associated with the handled request by the ID of the requests parent. The additional requests are generated from the outgoing byte stream and logged in the storage or transmitted to the central storage for proactive management or resource consumption management. The outgoing byte stream is converted into one or more packets by the operating systems to be transmitted to other tiers. The packets composed of outgoing byte stream are named outgoing packets and are tagged by the tagging unit with the current request id which is processed by the thread, if they are part of a request to the next tier.

Figure 4:
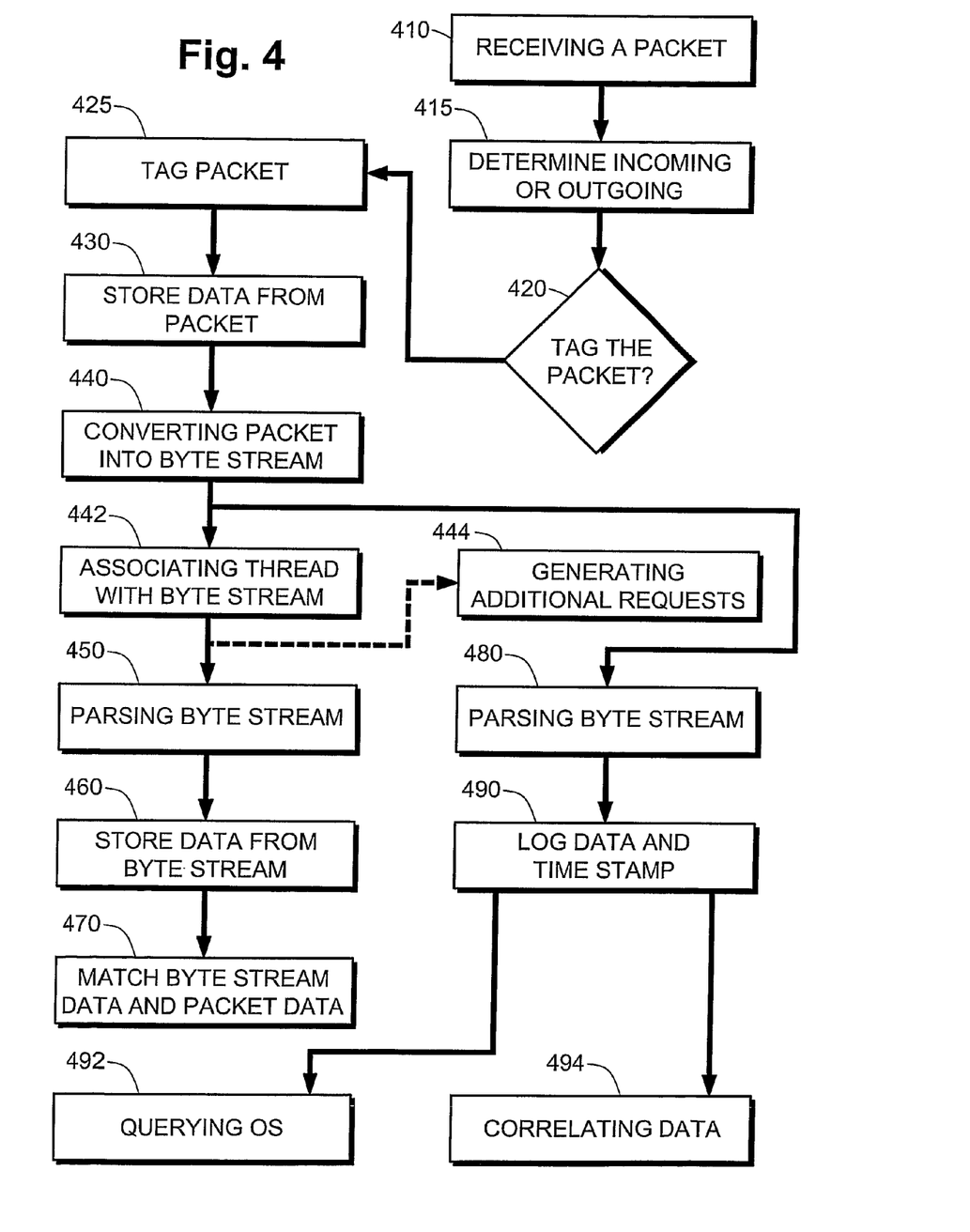
FIG. 4 is an exemplary method in which transactions are tracked and associated with threads and with other transactions or requests, according to an exemplary embodiment of the disclosed subject matter; and, FIG. 5 is a flowchart of steps taken in analyzing resource consumption of transactions after a transaction is tracked, according to an exemplary embodiment of the disclosed subject matter.

Referring now to FIG. 4, illustrating a schematic embodiment of a method of tracking a transaction as disclosed in the subject matter. In step 410, the tier receives a packet. The packet comprises data field, as well as other fields, such as IP addresses of the source and destination of a packet or request, IP port, time stamps, communication protocol type and the like. In step 415, the tier or elements within the tier determine whether the packet is an incoming packet or an outgoing packet, preferably using a flag indicating that a packet is incoming or its outgoing.

In step 420, in case the packet is outgoing, a tagging unit determines whether to tag the packet. In step 425, the packet is tagged. In alternative embodiments of the subject matter, the step of tagging the packet is excluded and may be replaced by logging every request with the exact time stamp, process ID, thread ID and IP:port address. In the event that the step of tagging is excluded, a central processing module connected to all tiers correlates between the event tables on each tier according to the logged data after logging the data, and determines a flow of a single transaction. The tagged packets are outgoing packets, converted from outgoing byte stream, after a request is processed within a tier. After an outgoing packet is tagged, the packet is transmitted to another tier, containing another request, namely an outgoing request. The outgoing packet contains the ID of the request that was processed in the previous tier, namely the parent ID.

In step 430, data related to the packet is stored in storage within the tier or communicated with the tier after the packet is received in the tier, functioning as an incoming packet. At least a portion of the data stored in the storage associated with a tier may be sent to a central storage connected to the storages for additional cross-tier analysis. Such data may comprise transaction ID, request ID, time-related data, resource consumption of the requests, IP addresses of tiers related to requests and the like. Resource consumption may be measured by the time a request or transaction are executed in one or more tiers, as well as the actual time spent within a specific tier by a single request or transaction. In some embodiments, the logged data may also include the exact time in which the first byte was sent or received or the last byte was sent or received and tagging records, so as to determine the exact time a reply to a request started and ended, or a request started or ended In step 440, the incoming packet is converted into an incoming byte stream by the operating system. The conversion may be performed using a TCP reassembly process. Next, in step 442, a thread is associated with the incoming byte stream that contains the data related to a request or a transaction. In some embodiments, the packets are stored in one or more queues before the TCP reassembly process, preferably in priority queues.

In case a central processing module, connected to the central storage, determines priorities related to transactions or entities related to requests or transactions, some packets or requests may be delayed or paused according to predetermined rules and properties of the transactions or requests. Further, association of threads or execution of threads related to requests or transactions may be delayed or terminated according to priorities or to the entity that relates to the request. Termination or delay of threads may be performed using the context switch of the thread. Alternatively, the tier or the central processing module may send instructions to the deployed agents within the tiers for enforcing limitations on resource consumption according to predefined specifications.

In some embodiments of the disclosed subject matter, in step 444 the thread associated with the byte stream may generate additional requests further transmitted to other tiers. The additional requests may be transmitted with the same request ID.

The byte stream is parsed in step 450 in order to detect data related to transactions or requests, preferably the request ID of the request that generated the byte stream that contains the handled request. In step 460, the data detected from the byte stream that relates to the transactions is stored in the storage associated with the tier. At this point, both data from incoming tagged packet and data from the incoming or outgoing byte stream associated with a thread are stored in the storage associated with the tier, or located within the tier. Next, in step 470, the data in the storage is processed in order to match data that relates to the byte stream that has the same request ID or IP:port address of the source or destination as the data detected from the packet. Once a request is matched with a thread, a request can be further tracked as disclosed above. For example, an HTTP request may be tracked and associated with a database query, once detected by the parser parsing incoming stream, can be associated with the http request sent from the previous tier that caused the thread in the previous tier to generate this database query to the next tier. The packets with the database query contain a tag storing the request ID of the http request, namely the parent request of the database query in the previous tier. This request ID is unique in the previous tier; therefore enable connecting between the database query and the http request.

Once the incoming packet is matched with the thread, the incoming request can be matched with the additional requests generated by the thread. Next, data related to the additional requests may be logged into the central storage for associating additional requests with the initial requests. Thus, a tree like view of a single request can be provided in real time, comprising other requests generated because of the initial request. In an exemplary embodiment of the subject matter, central processing module 250 determines the resource consumption of the initial request or transaction. Determining resource consumption is preferably performed by executing commands that measure the time during which a resource is consumed by one or more requests or transactions, as described above. Data relates to resource consumption may be transmitted from the user space agent to the central processing module.

In accordance with an alternative embodiment of the subject matter, another method for tracking a transaction utilizes port mirroring or network sniffing for parsing the network traffic between the different tiers in the topology. In these embodiments, disclosed in steps 490, 492 and 494, the step of tagging packets is excluded. In this case, the step of converting a packet into a byte stream (440) using the TCP reassembly process is actively performed by the central processing module instead of performed by the operating system. Next, in step 480, a parsing element parses the data for extracting applicative events such as for example, "SELECT", "HTTP GET" and the like.

All three embodiments include a first step of sniffing the network and extracting the events in each tier, including their IP:port address of source and destination. The first option is disclosed in step 490, in which a module located within the tracking apparatus logs IP:port address related to the request, for example a IP:port address and timestamp from which requests are sent to/from, and the related timestamp.

In step 492, a remote shell interface such as telnet is used for querying the operating system regarding IP:port address of the port used by each transaction and an associated process ID. In Linux, it can be done using 'netstat' or 'lsof' command and the like. Such commands are used for revealing which process ID or thread ID is associated with the event's IP:port address.

Alternatively, in step 494, an agent is used without a tagging unit. This case the apparatus may use the thread ID that executes a request, in addition to the IP:port address and the timestamp. Correlation may also be done according to the timestamp, and isolating single transactions by following details such as IP port, process ID, timestamp related to IP:port address or to process ID or thread ID.

Alternatively, associating requests related to the same transaction may be performed by detecting numbers or characters that repeats in many requests and associating the requests according to the numbers or characters. For example, detecting a hank account number that repeats in an HTTP request, then repeats in an SQL request and so on, the apparatus may determine that both requests relate to the same transaction.

Figure 5:
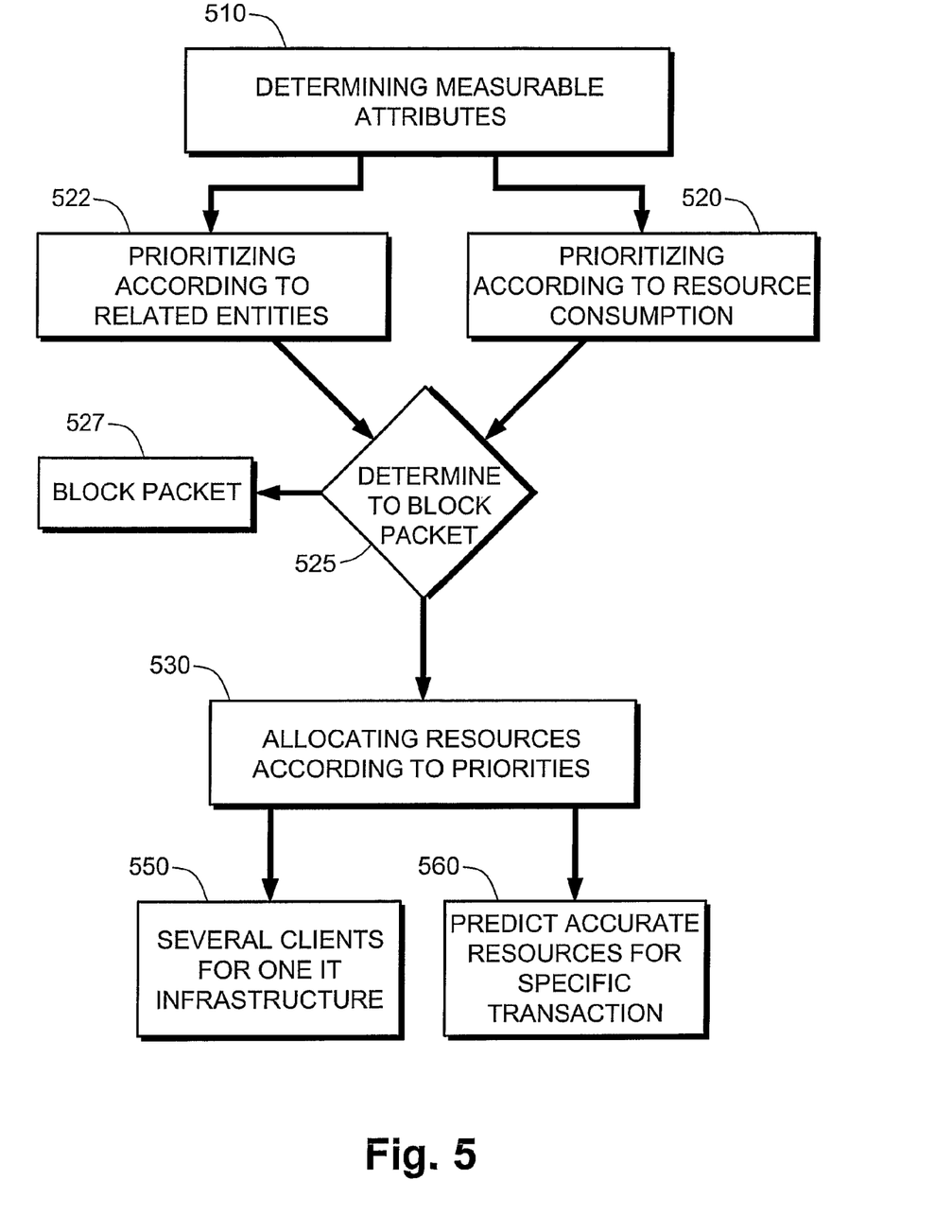

Referring now to FIG. 5, illustrating a schematic embodiment of a method performed as a result of tracking the transaction. In step 510, a unit connected to all tiers, such as central processing module 250, determines the resource consumption of a transaction or a request after or during the transaction is tracked via substantially all tiers it requires. Measurable attributes may comprise any one of the following: time; consumed time; speed; network speed; storage space; available space; space; free space; bit rate byte rate; read or write queue length; average queue length; temporary queue length; read or write time; transfer time; idle time; split i/o; packets; packets received; packets sent; packets per sec; bandwidth; received bytes; page faults; available bytes; committed bytes; commit limit; write copies; transition faults; cache faults; demand zero faults; pages input; page reads; pages output; pool paged; pool non paged; page writes; free system page table entries; cache; cache peak; pool paged resident; system code total; system resident code; system total resident; system total driver; packets received; packets sent; packets error; packets unknown; system driver; system resident driver; system resident cache; committed in use; processor time; user time; interrupt; threads; processes; system up time; alignment fix-ups; exception dispatches; floating emulations; registry quota in use; file read operations; file write operations; the control operations; file read bytes; file write bytes; file control bytes; context switches; system calls; file data operations; system up time; processor queue length; memory page faults; page file sys usage; page file sys peak. In step 520, requests or transactions are prioritized according to resource consumption. Prioritization of transactions can also be achieved by detecting the transaction context of every active thread within the operating system (OS), and then pausing, resuming or limiting resource consumption by using OS exposed API's for the method disclosed by the present subject matter. In step 522, requests or transactions are prioritized as a function of related entities. For example, in ease one entity is a client and another entity is an employee, the central processing module disclosed above may determine that requests relate to the employee are provided with higher priority than requests related to a client. This can be performed by parsing an event or request, determining the entity related to the request, determining a set of rules or a policy transmitted to the agent from the central storage. In other cases, priorities are provided among clients or employees, among languages, currency, credit account, credit status, method of payment and the like. Next, in step 525 the computerized apparatus determines how to manage a packet or request according to a predetermined set of rules, or a request or transaction related to the packet. For example, determine whether a specific thread should be temporarily paused or blocked, preferably according to comparing predefined priorities between different processed transactions to which the threads relate. In step 527, an action is taken according to determination performed in step 525. For example limiting thread resource consumption according to priorities, entities, resource consumption or the like, or blocking a thread from being executed in a tier, or from being associated with a specific request or packet containing a request ID or transaction ID.

In step 530, resources are allocated to specific transactions or requests according to priorities as determined in association with step 520 or step 522 as discussed below. Allocation of resources may determine that some tasks are postponed until other tasks arc terminated or reach a predefined stage. After allocating resources on step 530, various applications may be performed by the apparatus according to the subject matter. The applications may be, for example, differentiate users or clients with one IT infrastructure according to preprocessed resource consumption as performed on step 550, and predicting accurate resources for specific transactions as performed on step 560 based on previous logs on the central storage.

The subject matter also provides for long-term storage of events generated by a single transaction. Such storage may be useful for future disputes, internally or external with customers, regarding resource consumption of a specific entity or the service level offered by the application. For example, detecting the time required by a transaction, in terms of response time of one or more tiers. Thus, determine that a specific multi-tier functions properly and provides the user with a response time lower than a predefined threshold.

Additionally, the above methods enable applying Business Intelligence (BI) techniques on preprocessed data such as the resource consumption of a specific transaction during a specific period of time, specific language, load on a system, currency, clients, users, residence, transactions related to the analyzed transaction, and the like. For example, providing a weekly report regarding the amount or percentage of transactions that did not meet specific requirements. In another example, the apparatus may provide a report that ranks entities according to parameters such as number of transactions, resource consumption, bills and the like.

Specific transactions may require more resources than other transactions in order to meet their designated Service Level Agreement (SLA). Using the invention, one can create a resource consumption profile of each transaction, and detect the resources required for each transaction to be processed as fast as possible. By leveraging OS APIs and internal hooks, one can intervene with OS policies for CPU consumption, memory allocation or I/O utilization. The subject matter also discloses a system for allocating resources according to actual transaction needs in real-time, based on data received in real time from the tiers, regarding number of waiting packets, active threads and priorities thereof. Additionally, a module within a tier may detect the resource consumption within the tier every predetermined period of time. Thus, in case a thread or request consumes a resource using a value higher than a predetermined threshold, the thread or request may be paused. This detection is performed in real time and prevents load on the tier. The real time detection does not require the step of sending data to the central processing module, but can be done simply by detecting the request ID and determining the maximal resource consumption to be allocated to a request or a thread based on a set of rules or consumption limitation stored within the tier.

The subject matter also discloses methods for determining the amount of money billed by a consumer of IT infrastructure and an apparatus for implementing such methods. When a consuming business uses IT infrastructure related to a providing business, the billing may be performed as a function of resource consumption by a transaction or entity related to the transaction, as opposed to general usage of hardware. In other words, a providing business can offer one common it infrastructure for all consuming businesses, and bill them at the granularity of a specific transaction. The central processing module may provide accurate resource consumption data regarding each single executed transaction handled by the application within the tiers. This method of determining the amount of money replaces billing methods in which the sum of money is determined by the total infrastructure provided by the providing business. Therefore, IT infrastructure may be provided by one providing business to more than one consuming business, as the billing is divided by the more than to one consuming entities according to resource consumption or costs that relate to specific transactions executed by the consuming business. The central processing module may also comprise a set of rules using which the said amount of money, billing policies or promotions are determined. For example, overpaying according to the time of the day in which the resource is consumed.

The disclosed subject matter provides a technical effect by providing a real-time time and accurate tree like view of a transaction by associating a request delivered by a packet with the handling thread in a specific tier. The disclosed subject matter provides a technical solution or the problem of how to accurately determine resource consumption of a single or group of transactions, as well as determining resource consumption of transactions related to a specific entity. Further, resource consumption or other details related to a transaction enable the computerized environment to prioritize transaction or requests as a function of resource consumption or entities, for example determining which request to handle and which request to postpone or terminate, delay a request or thread, limit resource consumption of a thread or a request or other proactive management methods as disclosed above.

The disclosed subject matter also provides a technical solution by accurately determining the amount of IT infrastructure to be provided to an entity on a specific period of time according to previous records of resource consumption of the entity or resource consumption of one or more transactions. The disclosed computerized apparatus also provides a technical solution by determining whether to delay a thread or request in case they are related to a transaction that consumes resources higher than a predetermined threshold.

The methods and apparatus disclosed in the subject matter may be implemented in various operating systems, among which are windows versions, Linux, Solaris, mainframe, AIX, HPUX, AS400, VxWorks or any other OS and derivatives of the above.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized method for tracking transaction related information in a multi-tier computerized environment, the method comprising:
receiving a packet in a tier implemented on a general purpose computer having a processor;
determine whether the packet is an incoming packet or an outgoing packet;
for an incoming packet:
storing data associated with the incoming packet and data associated with an at least one request or transaction associated with the incoming packet;
parsing a byte stream generated from conversion of the incoming packet;
detecting data associated with the at least one request or transaction related to the byte stream;
matching a thread associated with the byte stream with the incoming packet according to predetermined fields within the byte stream;
determining from said storing, parsing, detecting and matching an identity of an initial request or transaction leading to said incoming packet and the identity of any request or transaction stemming therefrom in the tier;
for an outgoing packet;
tagging an outgoing packet sent from the tier, after at least a portion of the thread is processed, said outgoing packet is transmitted from the tier to another tier for performing an additional request or transaction or as a response to a request or transaction;
wherein the outgoing packet sent from the tier is tagged with an ID associated with the identity of the initial transaction.

2. The method according to claim 1, further comprising a step of storing data related to the at least one request or transaction associated with the incoming packet.

3. The method according to claim 2, further comprising a step of determining that at least one request or transaction is associated with another request by comparing an at least one previously stored parameter associated with the at least one request or transaction and with the other request.

4. The method according to claim 3, further comprising a step of prioritizing the at least one request or transaction according to an entity associated with the at least one request or transaction.

5. The method according to claim 1, wherein data related to the incoming packet, data related to the outgoing packet and data related to the at least one request or transaction processed by the tier are transmitted from the tier to an external central storage associated with a central processing module implemented on a general purpose computer having a processor to track request or transaction related information performed on tiers of the multi-tier computerized environment and the connection to requests or transactions stemming from them.

6. The method according to claim 5, further comprising a step of determining measurable attributes related to consumption of resources within tiers by a transaction from the data transmitted to the external central storage.

7. The method according to claim 6, further comprising a step of determining a profile for the at least one request based on data associated with measurable attributes related to consumption of the resources of the tiers by the at least one request.

8. The method according to claim 6, further comprising a step of determining measurable attributes related to consumption of resources of the tiers by the transaction as a function of consumption of the resources within tiers by the at least one request associated with the transaction.

9. The method according to claim 8, further comprising a step of determining a profile for the at least one transaction based on data associated with measurable attributes related to consumption of the resources within tiers by the at least one transaction.

10. The method according to claim 9, further comprising a step of predicting consumption of measurable attributes of the resources within tiers according to profile and quantity of the at least one request or transaction handled by the tiers during a predetermined period of time.

11. The method according to claim 9, further comprising a step of determining the tiers required resources according to the profile of the transaction or request consuming the resource within the tier.

12. The method according to claim 8, further comprising a step of prioritizing the at least one request or transaction as a function of measurable attributes related to consumption of the resources within tiers by the at least one request or transaction.

13. The method according to claim 12, further comprising a step of determining whether to delay or pause a thread according to the priority of the at least one request or transaction related to the thread.

14. The method according to claim 12, further comprising a step of allocating the resources within tiers to the at least one request or transaction according to the priority of the at least one request or transaction.

15. The method according to claim 14, further comprising a step of limiting the resources within tiers allocated to the at least one request or transaction according to consumption of resources required by another request or transaction.

\* \* \* \* \*